United States Patent [19]

Schmidt

[11] Patent Number: 5,255,563
[45] Date of Patent: Oct. 26, 1993

[54] APPARATUS FOR RETARDING THE MEASURING SPINDLE OF A BALANCING MACHINE

[75] Inventor: Horst Schmidt, Pfungstadt, Fed. Rep. of Germany

[73] Assignee: Hofmann Werkstatt-Technik GmbH, Pfungstadt, Fed. Rep. of Germany

[21] Appl. No.: 750,316

[22] Filed: Aug. 27, 1991

[30] Foreign Application Priority Data

Sep. 6, 1990 [DE] Fed. Rep. of Germany ....... 4028335

[51] Int. Cl.⁵ .............................................. G01M 1/02
[52] U.S. Cl. ..................................................... 73/462
[58] Field of Search ................. 73/460, 462, 487, 459, 73/471

[56] References Cited

U.S. PATENT DOCUMENTS

| | | | |
|---|---|---|---|
| 3,854,339 | 12/1974 | Muller | 73/462 |
| 3,866,489 | 2/1975 | Kimmelaer | 73/468 |
| 4,435,982 | 3/1984 | Borner et al. | 73/462 |
| 4,467,649 | 8/1984 | Mueller | 73/462 |
| 4,480,472 | 11/1984 | Wood | 73/462 |
| 4,489,607 | 12/1984 | Park | 73/462 |
| 4,984,126 | 1/1991 | Rothamel | 361/144 |

FOREIGN PATENT DOCUMENTS

| | | |
|---|---|---|
| 1082066 | 11/1960 | Fed. Rep. of Germany . |
| 2243002 | 11/1973 | Fed. Rep. of Germany . |
| 2639268 | 4/1977 | Fed. Rep. of Germany . |
| 3314287 | 12/1983 | Fed. Rep. of Germany . |
| 3730084 | 3/1989 | Fed. Rep. of Germany . |
| 2153095 | 8/1985 | United Kingdom . |

*Primary Examiner*—John E. Chapman
*Attorney, Agent, or Firm*—Cushman, Darby & Cushman

[57] ABSTRACT

In an apparatus for retarding the measuring spindle of a balancing machine after a measuring run in which the measuring spindle is brought up to the measuring speed of rotation by means of a hand crank, the measuring spindle is retarded by the co-operation of first and second brake discs, one of which is non-rotatably connected to the measuring spindle while the second rotates with the measuring spindle during the measuring run but is held in a stationary position relative to the frame structure of the machine in the retardation phase. The second brake disc is arrested upon termination of the measuring run by a holding pin which is actuated to engage an engagement location on the second brake disc, in dependence on the angular position and the speed of rotation thereof, to provide controlled arresting of the brake disc.

12 Claims, 2 Drawing Sheets

APPARATUS FOR RETARDING THE MEASURING SPINDLE OF A BALANCING MACHINE

BACKGROUND OF THE INVENTION

In one form of balancing machine for balancing a rotary member such as a motor vehicle wheel, the rotary member is carried on a measuring spindle which is brought up to a measuring speed of rotation by means of a hand crank. The balancing machine further includes an assembly for retarding the measuring spindle, for example, after the measuring run has been carried out, that assembly comprising two brake discs of which the first is non-rotatably connected to the measuring spindle while the second brake disc is fixed in the braking operation in a position which is stationary relative to the frame structure of the machine.

However, difficulties are encountered in fixing the second brake disc in its stationary position relative to the frame structure of the machine, by means of a suitable engagement arrangement.

SUMMARY OF THE INVENTION

An object of the present invention is to provide an apparatus for retarding the measuring spindle of a balancing machine, which can provide for retardation in a smooth and controlled fashion without causing severe stressing.

Another object of the present invention is to provide an apparatus for retarding the measuring spindle of a balancing machine which acts by stopping a brake disc in a fixed position for it then to co-operate with a rotating brake disc, so designed as to provide that the second brake disc is fixed in position to initiate the braking operation, in a careful and controlled fashion.

Still another object of the present invention is to provide a balancing machine including an arrangement for retarding the measuring spindle thereof in a smooth and properly controlled manner.

In accordance with the foregoing and other objects of the invention, an apparatus for retarding the measuring spindle of a balancing machine which is brought up to a measuring speed of rotation by means of a hand crank comprises first and second brake discs of which the first is non-rotatably connected to the measuring spindle while the second brake disc rotates with the measuring spindle during an unbalance measuring operation, in an unbraked condition, but is then fixed in the braking operation in a position which is stationary relative to the machine frame structure. For the purposes of fixing the second brake disc in its stationary position, the second brake disc has at least one engagement means for a holding pin mounted on the machine frame structure displaceably at least substantially normal to the direction of rotation of the second brake disc. After termination of an unbalance measuring operation, the holding pin, in dependence on the rotary position and the speed of rotation of the second brake disc, is brought into controlled engagement with said engagement means on the second brake disc by an actuating means which also serves as a support means for producing a braking moment.

As will be seen in greater detail hereinafter, the balancing machine is brought up to the measuring speed of rotation for carrying out an unbalance measuring operation, by means of a hand crank, and then the actual unbalance measuring operation is carried out as the measuring spindle continues to rotate. In that phase of operation, the first and second brake discs both rotate with the measuring spindle. To produce the retardation effect, the holding pin is brought controlledly into engagement with one or more of the engagement means on the second brake disc. The control effect is produced specifically in dependence on the position of the engagement location on the brake disc, which is nearest to the holding pin, and the speed of rotation at which the second brake disc is rotating with the measuring spindle. That ensures that the holding pin can come precisely into engagement with the appropriate engagement means on the brake disc.

Preferably, the engagement means on the second brake disc which is to be brought to a stop thereby is in the form of radially projecting abutment or stop arms. That configuration can provide that the holding pin is moved into the engagement position precisely just before the abutment or stop edge on the arm, in which case the holding pin only requires an actuating force which acts for a short time thereon, to move it into the appropriate operative position. After the holding pin has come into engagement with the abutment edge on the arm, the torque which is operative in the measuring spindle retardation phase and which thus acts against the holding pin so that the latter serves as a support to resist that torque causes the holding pin automatically to be held in the operative engagement position thereof. In other words, the holding pin is held in its operative engaged position by the abutment arm bearing firmly thereagainst. Accordingly, to provide for actuation of the holding pin, the actuating means thereof only needs to be supplied with power for a short period of time, to move it into the path of the abutment arm. The actuating means for the holding pin can preferably be in the form of an electromagnetic means acting as a linear stroke movement-producing solenoid, thereby to operate the holding pin. As only a small amount of power is required, the electromagnetic means may also be battery-powered so that there is no need for it to be connected to the mains system.

The first and second brake discs may preferably comprise plastic material, more especially commercially available thermoplastic material, so that they have a certain degree of elasticity and, by virtue of their material properties, produce the required braking effect. That choice of material further affords the advantage that they do not give rise to an impact or hammer effect, which would be the case when using hard materials.

In order to provide continuous information about the instantaneous rotary position of the engagement means or abovementioned abutment arms on the second brake disc, the apparatus may in a preferred embodiment include rotary angle sensing means or pick-ups and a reference mark generator. They may be in the form of incremental generators or pulse generators. In order to have a reference pulse for determining the appropriate rotational angle, a marking in the form of, for example, a permanent magnet may be provided on the second brake disc which is to be fixed to the machine frame structure in the braking operation. The permanent magnet can be sensed and the pulse or signal produced as a result of the sensing operation is the reference signal for the purposes of rotational angle positioning of the brake disc. The position of the other engagement means on the brake disc can then also be computed from that reference signal. It will be appreciated that it is also possible for each engagement means on the brake disc to be provided with a marking or a magnet.

Further objects, features and advantages of the present invention will become apparent from the following description of a preferred embodiment.

BRIEF DESCRIPTION OF THE DRAWINGS

The invention is more fully explained in the following detailed description wherein reference is made to the accompanying drawings, in which.

DESCRIPTION OF THE PREFERRED EMBODIMENT

Figure 1:
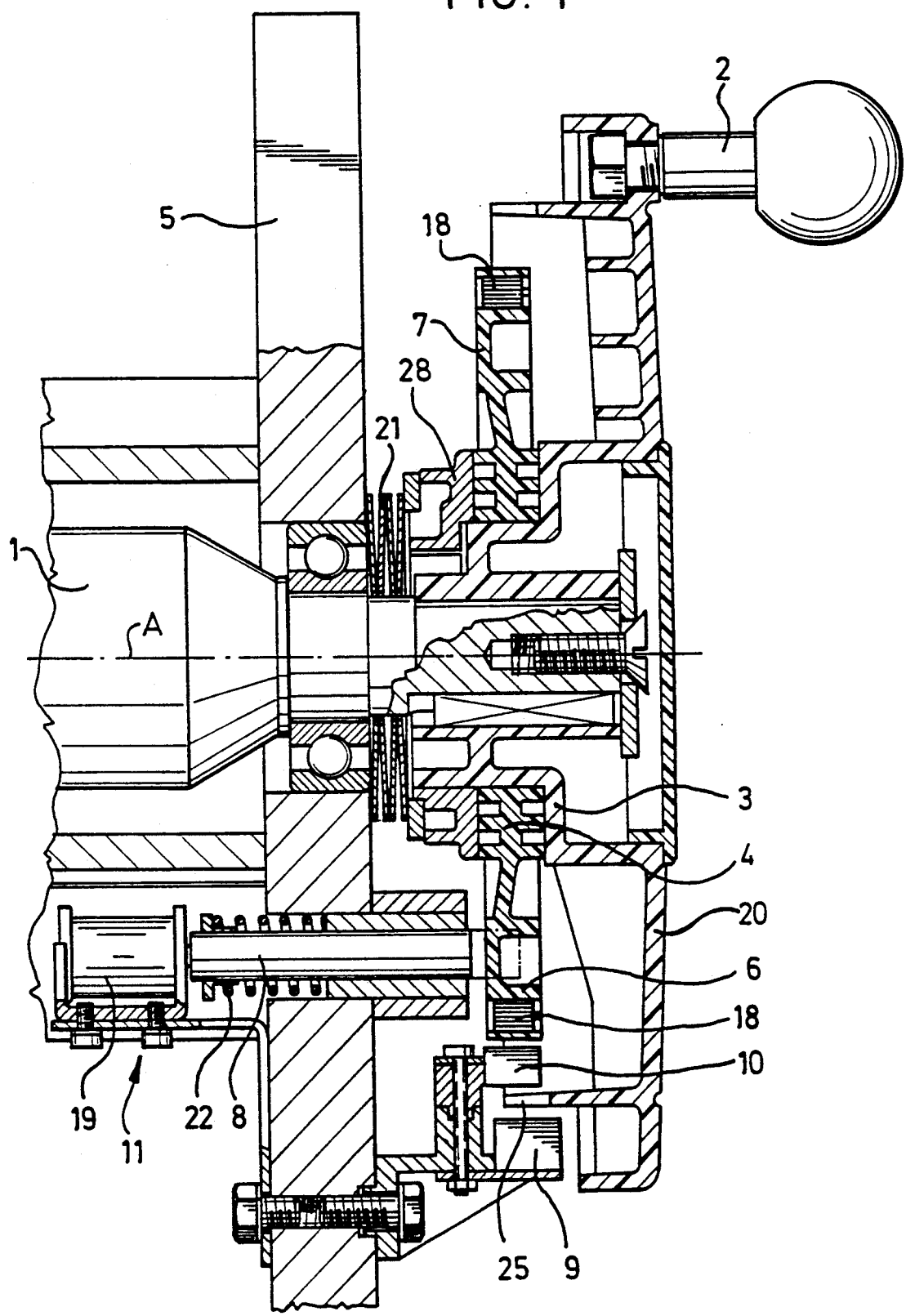
FIG. 1 is a diagrammatic view in partial section of an embodiment of the invention.

Referring firstly to FIG. 1, shown therein is an embodiment of an apparatus for retarding a measuring spindle 1 in a balancing machine, more especially a motor vehicle wheel balancing machine. The illustrated apparatus has a drive device in the form of a hand crank 2 with which the measuring spindle 1 and a rotary member such as a vehicle wheel which is clamped on the measuring spindle 1 but which is not shown in FIG. 1 can be brought up to the appropriate measuring speed of rotation. When that speed is reached the hand crank 2 is then released and the actual unbalance measuring operation is then carried out as the assembly continues to rotate.

The hand crank 2 is fixed to a crank wheel or disc 20 on which a first brake disc 3 is formed integrally therewith. The crank disc 20 and the first brake disc 3 are non-rotatably connected to the measuring spindle 1 by any suitable means.

The illustrated construction further includes a second brake disc 4 which, while the assembly is being accelerated up to the measuring speed of rotation and also during the phase in which the measuring spindle 1 continues to rotate and in which the unbalance measuring operation is carried out, also rotates with the crank disc 20 and thus the first brake disc 3 and the measuring spindle 1. The second brake disc 4 is pressed against the first brake disc 3 by plate or diaphragm-type springs 21 which are supported against a portion 5 of the frame structure of the housing of the installation, by way of an annular intermediate portion 28. The springs 21 also provide the retardation or braking force which is required for the retardation phase which will be described hereinafter.

Reference numeral 8 in FIG. 1 identifies a holding pin which is mounted on the machine frame structure 5 in parallel relationship to the axis A of the measuring spindle 1. As the holding pin 8 is parallel to the axis A of the measuring spindle 1, it is at least substantially normal to the direction of rotation of the second brake disc 4 and at least substantially normal to the plane of the brake disc 4. The holding pin 8 is mounted on the machine frame structure 5 displaceably by suitable means (not shown).

Reference numeral 11 identifies an actuating device for actuating the holding pin 8. The actuating device 11 includes an electromagnetic unit 19 acting as a linear stroke-producing solenoid. A spring 22 is operative to urge the holding pin 8 towards a rest position in relation to the machine frame structure 5, in which the holding pin 8 is therefore out of engagement with the second brake disc 4.

The holding pin 8 can be moved against the force of the spring 22 towards the right in FIG. 1 and into the operative position shown in broken lines in FIG. 1, by briefly powering the solenoid 19. As will be described hereinafter, that stroke movement on the part of the holding pin 8 occurs in a controlled fashion, to bring the holding pin 8 into engagement with the second brake disc 4, so that the brake disc 4 is brought into a position in which it is fixed relative to the housing frame structure 5, in a smooth and careful fashion such as to treat the materials involved carefully.

To provide the retardation phase of the apparatus, the second brake disc 4 has engagement locations for the holding pin 8. In the illustrated embodiment, two engagement locations 6 and 7 are shown in the form of radially outwardly extending abutment arms. Preferably the second brake disc 4 will have four abutment arms to act as engagement locations for the holding pin 8.

In order to provide information about the respective rotational angular position of the abutment arms on the second brake disc 4, acting as the engagement locations 6 and 7, the apparatus has an incremental generator device which outputs pulses supplying information about the respective angular positioning of the engagement locations on the second brake disc 4, after suitable evaluation thereof. For that purpose, provided on the machine frame structure 5 is a sensing device 9 which optically senses a tooth configuration 25 provided on the crank disc 20 around the entire periphery thereof.

Figure 2:
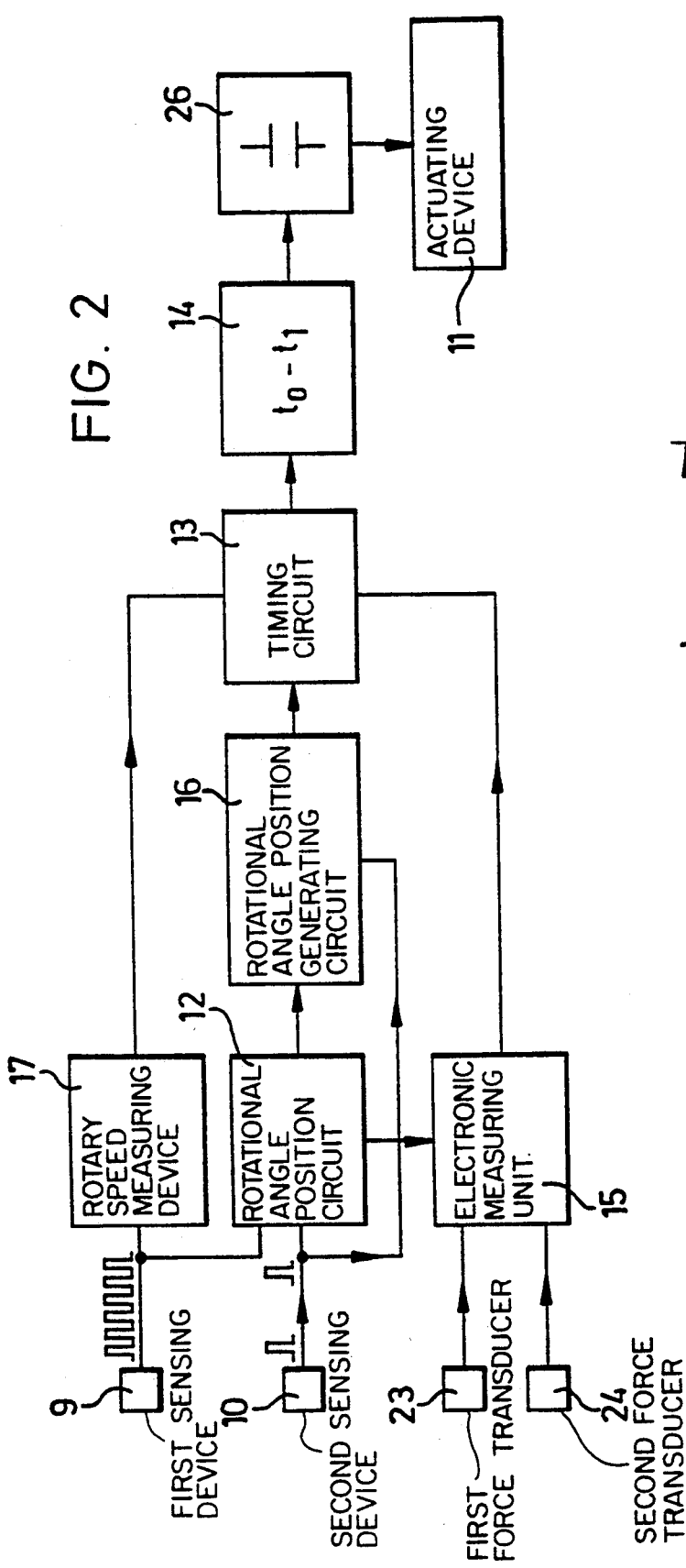
FIG. 2 is a block circuit diagram of a control circuit for actuating means of the embodiment shown in FIG. 1.

Looking now at FIG. 2, the sensing device 9 supplies a continuous pulse train, each pulse representing a rotational angle step of the disc 20 and the second brake disc 4 rotating therewith. The circuitry also includes a second sensing device 10 which senses permanent magnets indicated at 18 in FIG. 1, which are disposed on the abutment arms 6 and 7, for performing a marking function. As shown in FIG. 2, the sensing device 10 supplies a pulse whenever a permanent magnet 18 passes it. There is no need for each abutment arm to have a permanent magnet 18 as a marking, as it is sufficient for one of the abutment arms to have a permanent magnet 18 for performing a marking function.

If the other abutment arms which form the engagement locations for the holding pin 8 are at equal angular spacings from each other, it is possible by means of a simple computation circuit to ascertain the respective positions of the other abutment arms or engagement locations which do not have a marking 18, and then to take them into account with regard to controlled actuation of the holding pin 8.

The crank disc 20 and therewith the first brake disc 3 formed thereon as well as the second brake disc 4 comprise a plastic material. The surfaces of the brake discs are such that an adequate braking moment for retardation of the spindle 1 with a rotary member being balanced which is fixed thereon can be produced at the contact surfaces between the two brake discs 3 and 4, in co-operation with the springs 21 which produce the required force for urging the brake discs against each other.

Referring now again to FIG. 2, shown therein is the evaluation and control circuit for producing controlled specific actuation of the holding pin 8 for initiating the retardation phase of operation, after termination of the unbalance measuring phase while the crank disc 20 is freely rotating after having been brought up to the measuring speed of rotation. The circuitry shown in FIG. 2 comprises a rotary speed measuring device 17 connected to the sensing device 9. The rotary speed measuring device 17 evaluates the pulses supplied by the sensing device 9, in such a fashion that it supplies an output signal which is proportional to the speed of rotation of the spindle 1 and the two brake discs 3 and 4. A rotational angle position circuit 12 is connected to the sensing device 9 and to the sensing device 10. As already mentioned, the sensing device 10 produces a pulse which is caused by the marking means 18 on the second brake disc 4. That pulse can serve as a reference pulse for measurement of the rotational angle position of the arrangement, in conjunction with the pulse train supplied by the sensing device 9. That pulse also gives the respective position of the abutment arm or arms forming the engagement locations 6 and 7 on the second brake disc 4. The rotational angle position circuit 12 supplies an output signal which is proportional to the respective rotary position of the spindle 1 and the two brake discs 3 and 4. That means that the output signal of the circuit 12 is also used in ascertaining the angular position of the unbalance on the rotary body being balanced, in an electronic measuring unit 15 in which the measurement signals supplied by force transducers 23 and 24 are evaluated and assessed. The transducers 23 and 24 are of a known design and do not therefore need to be described in greater detail herein, supplying measurement signals which are proportional to the oscillations or forces emanating from the measuring spindle 1. Those signals are evaluated and assessed in the unit 15 in the usual manner.

The output signal of the circuit 12 is also passed to a rotational angle position generating circuit 16. The circuit 16 also receives the output signal from the sensing device 10 and evaluates the two signals which it receives in such a way that it then specifies the respective rotational angle position of the engagement locations 6 and 7 on the second brake disc 4. An output signal corresponding to that respective position of the engagement locations 6 and 7 is supplied by the circuit 16.

Connected to the output of the circuit 16 is a timing circuit 13 which further receives from the measuring unit 15 a signal which indicates the end of an unbalance measuring operation. The timing circuit 13 also receives from the rotary speed measuring device 17 a signal which is proportional to the speed of rotation of the rotating assembly. As that signal is constantly delivered, the timing circuit 13 also receives data about the instantaneous speed of rotation of the spindle 1 and the two brake discs 3 and 4 which are rotating therewith, at the time at which the unbalance measuring operation is terminated.

Figure 3:
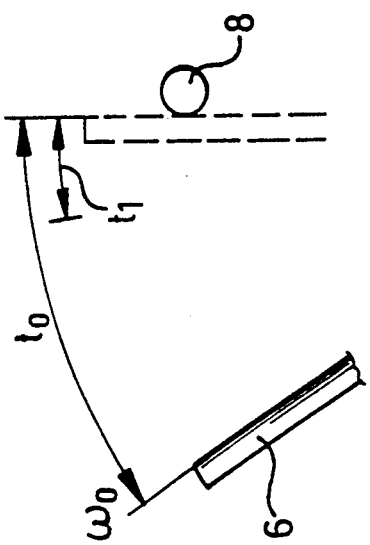
FIG. 3 is a diagrammatic view illustrating the control mode of the control circuit shown in FIG. 2.

The timing circuit 13 includes a dividing circuit which effects division of the signal giving the instantaneous speed of rotation Do at the end of the unbalance measuring operation, by the signal which gives the instantaneous angular position $\omega_o$ of the abutment arm on the second beake disc 4, which is nearest to the holding pin 8, as viewed in the direction of rotation of the brake disc. In FIG. 3, that abutment arm is indicated by reference numeral 6.

The dividing circuit in the timing circuit 13 accordingly performs the following computation:

$$\frac{\omega_0}{D_0} = \frac{\omega_0}{\omega_0/t_0} = t_0$$

in which to means the time which the abutment arm or engagement location 6 requires in order for it, with the detected instantaneous speed of rotation $Do = \omega o /to$, to arrive with its leading abutment edge of the abutment arm 6 at the position shown in broken lines in FIG. 3 in which it bears against the holding pin 8 upon output of the signal which indicates the end of the measuring operation.

As however a certain period of time as indicated at tl is required for the holding pin 8 to be moved from its rest position into its operative engagement position as shown in broken lines in FIG. 1, the circuitry shown in FIG. 2 includes a time difference circuit 14 which substracts the time interval tl from the time interval to. The time interval tl is the time required for the holding pin 8 to be actuated from its rest position into its operative position. The value tl also includes a slight extra period of time, as a safety factor, to ensure that the holding pin 8 is certain to be in the operative engagement position thereof before the abutment arm 8 reaches that position as shown in broken lines in FIG. 3. By virtue of that specific mode of controlling the actuating device 11 which moves the holding pin 8 into the operative engagement position, it is only necessary for the actuating force to be applied to the holding pin 8 for a relatively short period of time. When the abutment arm 6 is in the position of bearing against the holding pin 8, the latter is automatically held in its operative position of engagement with the abutment arm by the braking moment which the abutment arm 6 thus applies to the holding pin 8, the holding pin 8 then forming a support to withstand that braking moment so as to hold the brake disc 4 in a fixed position relative to the machine frame structure 5, thereby to produce the retardation effect.

As the time that the holding pin 8 requires to go from the rest position into the operative engagement position is known, the time interval tl can be easily ascertained and stored in a storage device in the time difference circuit 14. The time difference circuit 14 then performs the operation to−tl and thereby determines the precise moment in time at which the solenoid 19 is to be briefly powered, for example by the discharge of a capacitor into a driver stage 26, in order thereby for the holding pin 8 to be moved into its operative engagement position.

It will be noted that the invention can advantageously also provide a retardation effect which is independent of the direction of rotation so that measuring runs can be carried out in both directions of rotation with the unbalance measuring assembly which is actuated by the hand crank.

As indicated above, the above-described arrangement can preferably be used in relation to balancing machines for measuring the unbalance of a motor vehicle wheel or tire.

It will be appreciated that the above-described construction has been set forth solely by way of example and illustration of the principles of the present invention and that various modifications and alterations may be made therein without thereby departing from the spirit and scope of the invention.

What is claimed is:

1. An apparatus for retarding a measuring spindle of a balancing machine having a balancing machine frame, where the measuring spindle is brought up to a measuring rotation speed by a hand crank, said apparatus comprising:
   a measuring spindle;
   first and second brake discs adapted to co-operate with each other;
   means for non-rotatably connecting the first brake disc to the measuring spindle;
   means for causing the second brake disc to rotate with the first brake disc during an unbalance measuring operation of the balancing machine without providing a braking effect to said first brake disc; and
   means for fixing the second brake disc in a stationary position relative to the balancing machine during a retardation operation of the balancing machine to cause the second brake disc to provide a braking force to the rotating first brake disc, thereby producing a retardation effect at the measuring spindle, said fixing means comprising at least one engagement location on said second brake disc, a holding pin mounted on the balancing machine frame and displaceable at least in a direction substantially normal to a direction of rotation of the second brake disc, measuring means for determining a rotational angle position of said second brake disc and providing a signal indicative thereof and for determining a speed of rotation of said second brake disc and providing a signal indicative thereof, and actuating means for actuating said holding pin into an operative position of engagement with said at least one engagement location in a controlled fashion responsive to said signals provided by said measuring means after termination of an unbalance measuring operation.

2. An apparatus as set forth in claim 1, wherein:
   said second brake disc has at least one marking associated with said at least one engagement location, and
   said apparatus further comprises monitoring means for monitoring an angular position of the second brake disc by sensing said at least one marking and for providing a signal indicative of said angular position, wherein
   the actuating means is responsive to said signal to bring the holding pin into engagement with said engagement location.

3. An apparatus as set forth in claim 1, wherein:
   said actuating means is further for applying a transient force to the holding pin to engage the holding pin with the engagement location on the second brake disc.

4. An apparatus as set forth in claim 1, said at least one engagement location comprising a plurality of engagement locations disposed at substantially equiangular positions on the second brake disc.

5. An apparatus as set forth in claim 1, wherein said at least one engagement location comprises at least one abutment arm projecting substantially radially from the second brake disc.

6. An apparatus as set forth in claim 1 wherein the brake discs each comprise plastic material.

7. An apparatus as set forth in claim 1, said apparatus further comprising:
   rotary speed measuring means for generating a first signal proportional to a rotational speed of the second brake disc; and
   rotational angle position sensing means for generating a second signal proportional to a rotational angle position of the at least one engagement location on the second brake disc;
   means for generating a third signal indicative of an end of an unbalance measuring operation; and
   means for receiving the first, second signals and third signals and for operating the actuating means to actuate the holding pin when the third signal indicates the end of an unbalance measuring operation.

8. An apparatus as set forth in claim 1 wherein the actuating means includes a solenoid.

9. An apparatus as set forth in claim 8 further comprising a battery, said battery being connected to said solenoid for providing operative power thereto.

10. An apparatus as set forth in claim 7 wherein said rotary speed measuring means comprises:
    sensing means for sensing incremental rotation of said second brake disc, said sensing means including an incremental generator; and
    reference signal generator operable to sense rotary movement of the spindle and the second brake disc.

11. An apparatus as set forth in claim 10 including
    electronic measuring means for calculating an angular position of an unbalance of a wheel mounted on said spindle, and
    force transducers connected to said electronic measuring means for providing signals indicative of a position of said unbalance.

12. In a balancing machine for a rotary body including a support structure, a measuring spindle rotatably carried by said support structure for carrying the rotary body, and means for accelerating the measuring spindle to a measuring speed of rotation, an apparatus for retarding said measuring spindle comprising:
    first and second brake discs adapted to co-operate with each other;
    means fixedly disposing the first brake disc on the measuring spindle;
    means for causing the second brake disc to rotate in unison with the first brake disc during an unbalance measuring operation of the balancing machine without providing a braking effect to said first brake disc; and
    means for fixing the second brake disc in an at least substantially stationary position relative to the balancing machine support structure thereby producing a retardation effect at the measuring spindle;
    said fixing means comprising at least one engagement location on said second brake disc, a holding pin mounted on the balancing machine support structure and displaceable at least in a direction substantially normal to the plane of rotation of the second brake disc, actuating means for actuating said holding pin into an operative position of engagement with said at least one engagement location on said second brake disc, and sensing means for sensing rotary motion of said second brake disc and for controlling said actuating means to cause said holding pin to be brought into engagement with said at least one engagement portion responsive to the angular position and the speed of rotation of the second brake disc after termination of an unbalance measuring operation of the balancing machine.

* * * * *